United States Patent Office 3,424,282
Patented Jan. 28, 1969

3,424,282
DUAL-NETWORK DISK BRAKE
Ernst Meier, Frankfurt am Main-Sindlingen, Germany, assignor to Alfred Teves G.m.b.H., Frankfurt am Main, Germany, a corporation of Germany
Filed Nov. 6, 1967, Ser. No. 680,831
Claims priority, application Germany, Nov. 12, 1966, T 32,505
U.S. Cl. 188—152      10 Claims
Int. Cl. B60t 11/20, 11/24; F16d 63/00

ABSTRACT OF THE DISCLOSURE

A dual-network disk brake wherein individual fluid transmission networks deliver respective streams of fluid to the wheel-brake cylinders in opposite lobes of a housing reaching around the periphery of a disk connected with the wheel of the housing, the housing having surfaces flanking the wheel-brake cylinders and the corresponding brakeshoes and co-operating with the cylinders on the opposite side of the disk for seizing the disk between an operative brakeshoe and the opposing surface when one of the cylinders fails. Either the disk or the housing can be limitedly deflectable in the axial direction to permit seizure of the disk, while the surfaces preferably are formed with plug-shaped brake pads at least partly received in the housing. When the pads are omitted, the metal-to-metal contact between the surfaces and the disk generates sufficient noise to warn the driver of the failure of one of the brake networks.

Figure 1:
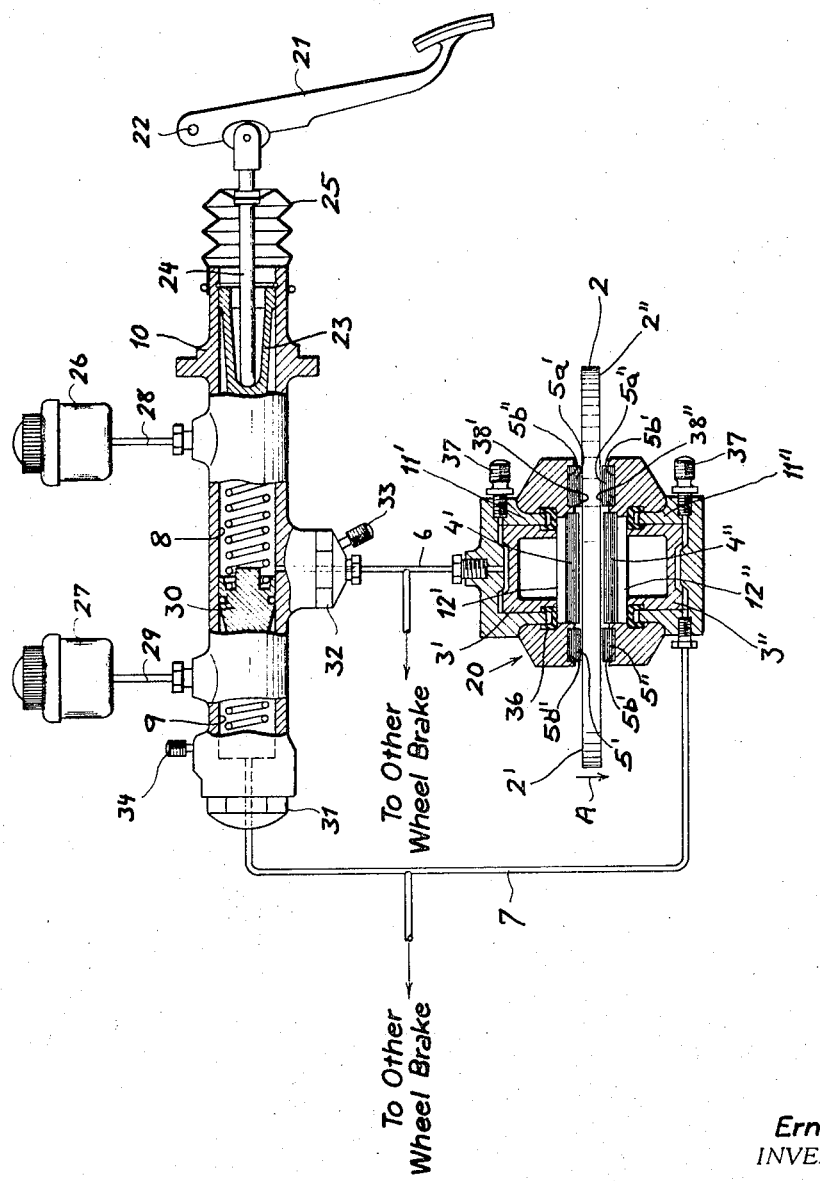

My present invention relates to a disk-brake system for automotive vehicles and, more particularly, a segmental disk brake having individual actuating means connected in respective networks of a dual-network brake system.

Because of the rapid response of disk-type brakes, they have become increasingly desirable for automotive applications and have, to a large extent, replaced the drum-type brakes heretofore common for four-wheel or two-wheel systems. Thus, internal-expansion brakes may be avoided entirely or may be used for the rear wheel of an automotive vehicle while the disk-type brakes are used for the front wheels. Moreover, it has become the practice, and is even required by law in many places, to provide a dual-network brake system in which a two-section brake master cylinder contains a pair of jointly displaceable but individually effective pistons to drive brake fluid into respective fluid-transmission networks and wheel-brake cylinders so that, upon the failure of one of the hydraulic networks (e.g. because of leakage, breakdown of the seals), the other network remain functional and the operator is able to stop the vehicle. When the term "disk" brake is used herein, it is intended to described so-called "segmental" disk brakes in which the rotatable braking face is constituted by a disk which is bolted or otherwise affixed to the vehicle wheel or its axle and has a pair of generally parallel and coextensive annular braking faces lying in planes perpendicular to its axis of rotation; the disk is flanked over only a portion or segment of its periphery by a brake yoke or housing which generally reaches around the disk in this region and has a pair of lobes flanking the braking faces of the disk and connected together by one or more bridge pieces. A variety of actuating systems have been proposed for disk brakes of this character, the lobes of which are provided with respective brakeshoes confronting the braking faces of the disk. In one system, a single hydraulically pressurizable wheel-brake cylinder is provided in one lobe and has a piston which urges it brakeshoe directly against the disk while the other brakeshoe is drawn against the disk by the reaction force applied to the cylinder and transmitted to the second brakeshoe by a bridge piece. Lever, toggle and even flexible force-transmitting linkages have also been proposed to displace the second brakeshoe in step with the actuation of the first by hydraulic fluid from the master cylinder. A more common disk-brake construction, however, provides a pair of wheel-brake cylinders each of which has a piston acting upon the respective brakeshoe and pressurizable from the same or different hydraulic networks.

It has also been proposed to provide disk-brake assemblies in conjunction with dual-network brake systems in which separate fluid-supply networks deliver the brake fluid to respective wheel-brake cylinders. For the most part, these networks are individually pressurized from a two-compartment master-cylinder assembly, e.g. a tandem or twin master cylinder, so that a failure in one of the networks will nevertheless permit the other to remain effective and perform a braking action. Consequently, dual-network brakes of this character are for increased safety. They do, however, also create problems with respect to braking effectiveness since the several different types of dual systems invariably are substantially less effective than normal brake functions. Thus, when one network supplies the front-wheel brakes and the other network energizes the rear-wheel brakes, a failure in one or the other network will result in braking of only one of the axles with substantial danger of skidding, oversteering or the like. On the other hand, when one of the networks supplies the wheel-brake cylinders on one side of the brake disk while the other network energizes the wheel-brake cylinders of the other side, the failure of one of the networks results in a nonuniform frictional engagement of the brakeshoes with the disk, possible distortion of the disk and damage to the actuating means, as well as undue stress upon the housing structure which receives a one-sided loading.

It is, therefore, the principal object of the present invention to provide a disk-brake system using a dual-network transmission arrangement in which the aforementioned disadvantages can be avoided and a relatively uniform, two-sided application of the brake can be ensured in spite of failure of one of the brake networks.

Another object of this invention is to provide a simplified, disk-brake structure whereby undue stress upon the housing, damage to the brake yoke or disk, and insufficient frictional engagement with the disk can all be avoided.

I have now found that it is possible to achieve these objects by providing a brake system of the disk-brake type, preferably for all four wheels of an automotive vehicle, which comprises a housing member extending around the periphery of the brake-disk member and carrying a pair of actuating cylinders adapted to apply respective brakeshoes frictionally against the disk. Flanking the brakeshoes, I provide the housing member with pairs of stationary anvil pads, having frictional lining similar to those constituting the brake lining and operatively associated with the brakeshoes of the opposite side of the disk but symmetrically offset outwardly therefrom relative to an axial plane of the disk through the axis of the actuating cylinder. More specifically, a system is used which comprises a main brakeshoe axially shiftable in the housing member on one side of the disk and adapted to bear upon a corresponding braking face, while a pair of anvil members are designed to engage the other braking face of the disk (i.e. on its opposite side) upon failure of the network supplying the actuating cylinder for the main brakeshoe on that side. Since the pads are provided in association with the brakeshoes and become effective only when the main brakeshoes are rendered inoperative or have insufficient stroke, they function as anvils taking up the pressure which is applied to the brake disk by the operative main brakeshoe. Advantageously, the pads on each side of the brake are set back from the main brakeshoe at this side by a distance from the disk beyond the normal play of the brake, thereby requiring the operative main brakeshoe on the opposite side of the disk to generate a greater stroke than would be necessary for normal brake application before the operative main brakeshoe engages its face of the disk and brings the other face of the disk into contact with the brake pads. Thus, upon failure of one of the fluid-transmission systems, the other transmission system remains effective, albeit with increased stroke, to apply the brake with substantially undiminished braking effectiveness assuming that the surface area, texture and frictional coefficient of both pads on the opposite sides of the disk have essentially the same effective areas as the inoperative brakeshoe disposed therebetween. In this manner, even if there is a failure of one of the transmission networks, full braking effectiveness is applied at the wheel axles and a full utilization of the vehicle weight in the braking operation is ensured.

It is an important aspect of the present invention that one of the aforementioned members, i.e. the housing member of the brake or the disk member, is at least limitedly shiftable axially with respect to the other member in a direction perpendicular to the braking faces of the disk. To this end, the brake housing can be mounted in shock-absorbing cushions or other resilient means affording limited relative movement of the housing, while the brake disks may be similarly mounted. Such relative movement is necessary to ensure contact between pads which are fixed to the housing, and the respective braking face of the disk when the brake pedal of the vehicle is depressed. Instead of a resilient mounting, the disk may have a deformable portion permitting the displacement of the disk into contact with the pads by an opposing brakeshoe.

Since the seizure of the disk between two opposing surfaces is ensured in spite of failure in one of the transmission networks, the increased stroke of the remaining network and, therefore, of the master cylinder is held to a minimum. Thus it is difficult for the vehicle operator to ascertain that there has been a failure in the dual brake system. While any conventional warning lamp or other indicating means can be provided to signal a defect in one or the other of the transmission lines, I prefer to provide an inherent signal which will indicate the fact that one of the hydraulically displaceable brakeshoes has been rendered ineffective. Thus the stop surfaces of the brake housing along the side opposite the effective piston can have metallic surfaces engageable with the disk and free of the usual friction pads thereby providing a grating sound when frictional engagement between the surface and the disk commences. In other words, the failure of one of the hydraulically displaceable brakeshoes permits the anvil surfaces of the housing to engage the corresponding face of the disk when the other brakeshoe urges the disk against the anvil surfaces. The distinctive noise produced by the brake is readily recognized as indicating that one of the hydraulically displaceable brakeshoes has become ineffective.

According to a further feature of this invention, the anvil pads flanking the hydraulically displaceable brakeshoes form stops for the disk when the brakeshoe on the same side of the disk becomes ineffective and can be cemented, riveted or bolted to the housing. Furthermore, the brake system can operate with tandem or twin master cylinders or even with circulating hydraulic arrangements with valve-controlled cylinders described in greater detail hereinafter.

Figure 2:
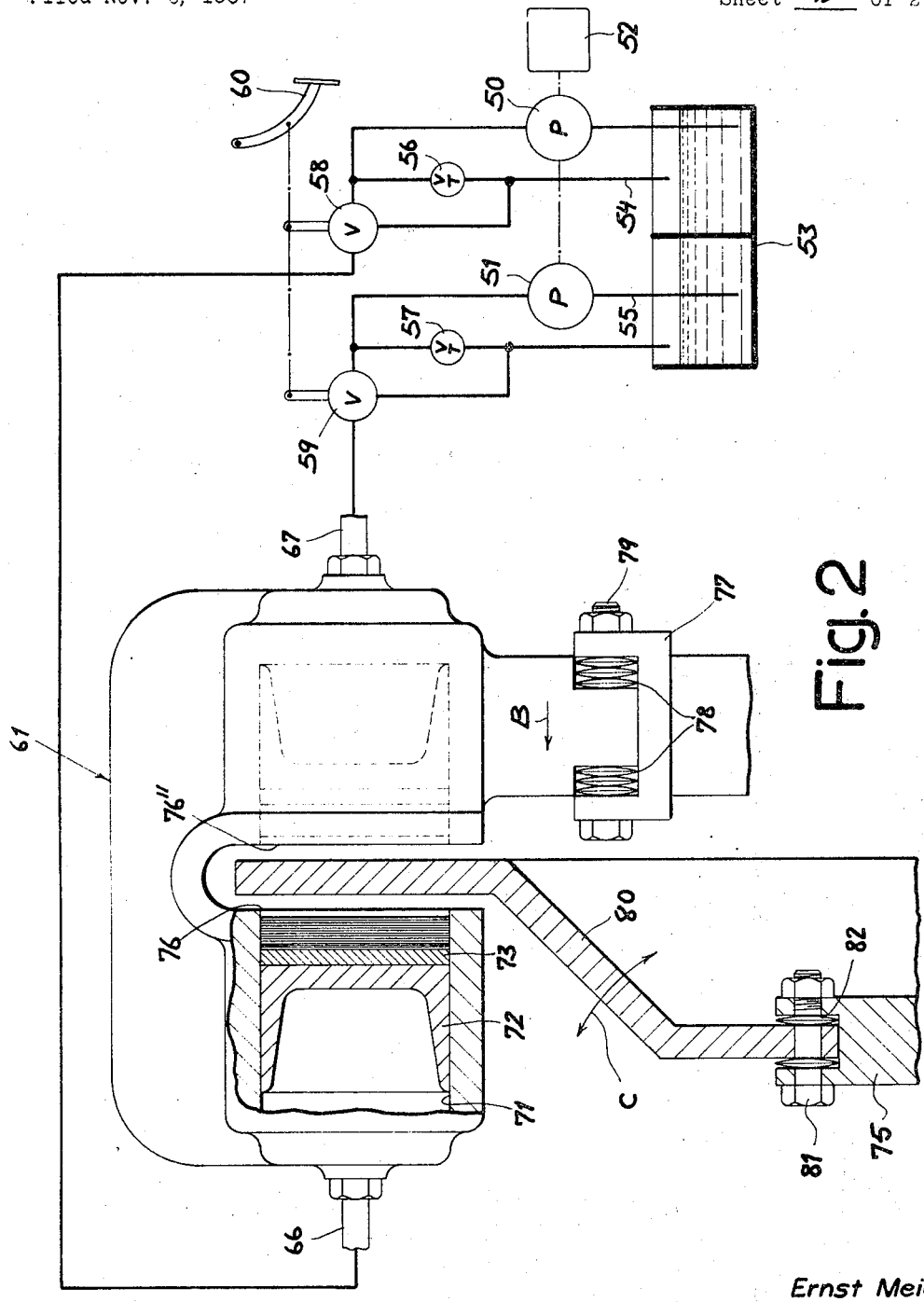

The above and other objects, features and advantages of the present invention will become more readily apparent from the following description, reference being made to the accompanying drawing in which:

FIG. 1 is an axial cross-sectional view through a disk brake embodying the invention, the disk brake being operatel by a tandem-master cylinder; and FIG. 2 is a side-elevational view, partly broken away, of another brake system embodying this invention.

In FIG. 1, I show a brake system in which the tandem-master cylinder 10 has a pair of compartments 8, 9, connected via lines 6, 7 to the respective hydraulic working chamber or wheel-brake cylinder of a disk brake generally represented at 20. The master cylinder 10 is actuated by the vehicle brake pedal 21 which is fulcrumed at 22 to the vehicle body and actuates one master-cylinder plunger 23 via the connecting rod 24. A cuff 25 prevents the entry of contaminants into the interior of the master cylinder. The master cylinder 10 is surmounted by a pair of reservoirs 26 and 27 which are connected to the chambers 8, 9 via lines 28 and 29. Between the chambers 8 and 9, the piston 30 is provided to displace fluid through the line 7 past a valve assembly 31, a similar valve assembly being provided at 32 for chamber 8. Bleed valves 33, 34 of the customary type eliminate air from the system. The check valves 31 and 32 are of conventional construction and are designed to retain pressure in lines 6 and 7 at least to a limited extent when the pedal 21 is released.

According to the principles of the present invention, the disk brake comprises a brake disk 2 connected to the axle or wheel of the vehicle and, in this case, corresponding wheel brakes are provided at each of the wheels. A brake yoke or housing 1 extends around the periphery of the disk and has lobes on opposite sides, i.e. flanking the braking faces 2' and 2". The pressure in the primary brake network is generated in chamber 8 of the master cylinder 10 and is delivered via a duct 6 to the brake cylinder 11' in one lobe of the housing 1 to actuate the brake piston 3' which supplies force to the backing plate 12' of a brakeshoe whose lining 4' is frictionally engageable with the disk 2. Similary, pressure from chamber 9 of the tandem-master cylinder 10 is delivered via line 7 to the wheel-brake cylinder 11" in the other lobe of the housing 1 and drives the piston 3" in the direction of the braking face 2" of disk 2. The brakeshoe comprises a backing plate 12" to which the brake lining 4" is bonded. In addition, the main brake pistons 3' and 3" and the main brakeshoes 4', 12' and 4", 12" are provided with seals 36 preventing entry of contaminants into the wheel-brake cylinders and with conventional bleeding valve 37 for venting air from the wheel-brake cylinder.

Tangentially flanking the main brakeshoes 4', 12' and 4", 12", I provide a pair of abutment surfaces 38' and 38" which are engageable with the faces 2' and 2" of the disk upon failure of the opposing brakeshoes 4" and 4', respectively, as will be described in greater detail hereinafter. When these surfaces are metallic, i.e. are not provided with friction pads as in the system of FIG. 2, a raucous sound is generated when they engage the disk, thereby informing the vehicle operator of a failure in one of the networks. In general, the surfaces 38' and 38" should have areas similar or identical to those of the opposing main brakeshoes 4", 12" and 4', 12', respectively.

In the embodiment of FIG. 1, I show a system wherein plug-shaped friction pads 5' and 5a' flank the main brakeshoe 4', 12' on one side of the disk while brake pads 5" and 5a" flank the other brakeshoe 4", 12". The surfaces 38' and 38" are disposed closed to the brake faces 2' and 2" (i.e. project forwardly of the brake linings 4' and 4" of the same side of the disk) than the main braking faces so that the additional stroke upon failure of one of the networks will amount only to the normal brake stroke of the operative piston plus the distance between the opposing surface of the housing and the disk. This increased stroke will not be noted by the average driver so that a warning signal of the character previously described or of some conventional sort should be provided. In the embodiment of FIG. 1, the disk 2 is axially deflectable as represented by arrow A.

During normal brake operation, depression of the brake pedal 21 will drive the master-cylinder pistons to the left and uniformly force fluid from chambers 8 and 9 via the networks 6 and 7 into the wheel-brake cylinders 11' and 11'. Both pistons 3' and 3" will advance simultaneously to grip the disk 2 between them and brake frictionally the rotation of the disk. In the event of failure of the master-cylinder chamber 8 or the network 6, the main brakeshoes 4', 12' remain inactive while fluid is supplied from chamber 9 to network 7 to displace piston 3" and advance its brakeshoe 4", 12" into frictional contact with the disk 2. Additional brake-pedal force permits the disk 2 to deflect towards the auxiliary braking faces 38' which, with brake lining 4", co-operate in seizing the disk 2 with a braking effectiveness close to that obtainable when both master cylinders are operative. Conversely, a failure in network 7 permits the piston 3' to displace the brakeshoe 4', 12' against the disk 2 and brings the opposing face 2' into engagement with the surfaces 38" of the auxiliary friction pads. The pads 5', 5a' and 5", 5a" are recessed in cavities 5b' and 5b" in the faces of the brake yoke 1 confronting the disk 2 and may be held therein by adhesive bonding, riveting or by screwing the plugs into an internal thread of the recess.

In FIG. 2, I show a system in which the individual brake networks are of the circulating-fluid type. In this system, pumps 50 and 51, driven by the engine 52 of the vehicle, circulate brake fluid from a reservoir 53 along circulating paths 54, 55, each containing a throttle valve 56, 57 building up pressure behind it, this pressure is tapped off via valves 58, 59 connected to a brake actuator 60 and delivering fluid under pressure to the lines 66 and 67 supplying the wheel-brake assembly whose housing is shown at 61. The wheel-brake cylinders 71 (one shown broken away) are individually energizable to displace their piston 72 and the main brakeshoes 73 against the braking face of a disk 74 whose hub 75 is connected to the vehicle axis. Flanking the brakeshoes 73, there are provided metallic housing faces 76 which engage the disk 74 when the main brakeshoe 73 on the same side becomes ineffective.

To permit resilient deflection for such operation, the yoke 61 may be mounted on the axial housing 77 with limited freedom of axial movement (i.e. in the direction of arrow B) corresponding to the movement of the pistons for brake operation. The mounting means may include stacks 78 of Belleville washers surrounding bolt-like guide rails 79. Thus, when the brakes are applied and the wheel-brake cylinder at the right-hand side is rendered ineffective by a defect, the brakeshoe 73 will initially engage the disk 74 and then draw the housing 61 to the left against the force of the Belleville washers to bring the surface 76" into engagement with the disk. Conversely, operation of the right-hand brakeshoe when the left-hand shoe is ineffective, brings the surfaces 76 into engagement with the disk. Alternatively or in addition, the brake disk 74 may have a web 80 affording limited deflection of the disk 74 as represented by arrow C or else the disk may be mounted on the axle 75 in guide rails 81 by Belleville washers 82 which function in the manner previously described. The disk 2 of FIG. 1, of course, can be similarly mounted.

I claim:

1. A dual-network brake system comprising a pair of individually pressurizable fluid-transmission networks, and at least one brake assembly operable by said networks, said assembly comprising a rotatable disk member and a housing member reaching around said disk member and generally fixed with respect to the axis of rotation thereof, a pair of fluid-responsive cylinders formed in said housing member on opposite sides of said disk member, a pair of main brakeshoes disposed between each of said cylinders and a respective face of said disk for displacement into frictional engagement with said disk upon fluid pressurization of said cylinders, said cylinders each being connected with one of said networks for individual pressurization thereby, and abutment surfaces on said housing means separate from said main brakeshoes confronting said disk along a side thereof opposite respective ones of said brakeshoes for seizing said disk between one of said surfaces and the corresponding brakeshoe upon pressurization of the brake cylinder associated therewith and upon failure of the brakeshoe disposed at the same side of the disk as said one of said surfaces.

2. The system defined in claim 1 wherein said surfaces are metallic for generating a noise upon frictional engagement with said disk of a level sufficient to warn an operator of a failure in the network supplying the inoperative cylinder.

3. The system defined in claim 2 wherein said surfaces are disposed closer to said disk than said main brakeshoes in the rest positions of the latter.

4. The system defined in claim 1 wherein said surfaces are formed by friction pads secured to said housing member.

5. The system defined in claim 4 wherein said pads are plugs partly recessed in said housing member.

6. The system defined in claim 4 wherein said pads on each side of said disk have effective surface areas frictionally engageable with said disk equal in area to that of the main brakeshoe on the same side of said disk and flanking the main brakeshoe.

7. The system defined in claim 1 wherein each of said cylinders is provided with a piston shiftable upon fluid-pressurization of the respective cylinder parallel to the axis of rotation of the disk and perpendicular to the braking faces thereof, one of said members being limitedly and elastically shiftable in axial direction to bring said surfaces selectively into frictional engagement with said disk in the event of failure of the opposing cylinder.

8. The system defined in claim 7 wherein said brake assembly is a wheel brake of an automotive vehicle and said disk member is resiliently deflectable.

9. The system defined in claim 7 wherein said brake assembly is a wheel brake of an automotive vehicle and said disk member is mounted on a wheel axle with limited freedom of axial movement.

10. The system defined in claim 7 wherein said brake assembly is a wheel brake of an automotive vehicle and said housing member is a brake yoke mounted upon an axle housing of the vehicle with limited freedom of axial movement.

References Cited

UNITED STATES PATENTS 3,156,325   11/1964   Taylor.
3,337,009   8/1967    Meier.

GEORGE E. A. HALVOSA, *Primary Examiner.*

U.S. Cl. X.R.

188—1